(12) United States Patent
Myny et al.

(10) Patent No.: US 6,648,239 B1
(45) Date of Patent: Nov. 18, 2003

(54) DEVICE FOR DISPENSING ANIMAL SCENTS

(75) Inventors: Michael A. Myny, Chesterfield Township, MI (US); Lawrence H. Obrzut, Marine City, MI (US)

(73) Assignee: Scent Sticks, Inc., New Baltimore, MI (US)

( * ) Notice: Subject to any disclaimer, the term of this patent is extended or adjusted under 35 U.S.C. 154(b) by 0 days.

(21) Appl. No.: 10/229,182

(22) Filed: Aug. 27, 2002

(51) Int. Cl.$^7$ ................................................ A24F 25/00
(52) U.S. Cl. .............................. 239/44; 239/47; 239/57; 239/34
(58) Field of Search ............................... 239/34, 44, 45, 239/47, 57

(56) References Cited

U.S. PATENT DOCUMENTS

| | | | | |
|---|---|---|---|---|
| 2,609,230 A | * | 9/1952 | Raleigh | 239/47 |
| 3,515,302 A | * | 6/1970 | Curran | 239/57 |
| 4,165,835 A | * | 8/1979 | Dearling | 239/45 |
| 5,746,019 A | * | 5/1998 | Fisher | 239/47 |
| 6,241,161 B1 | * | 6/2001 | Corbett | 239/58 |

* cited by examiner

*Primary Examiner*—Dinh Q. Nguyen
(74) *Attorney, Agent, or Firm*—Harness, Dickey & Pierce, PLC

(57) ABSTRACT

A device for dispensing animal scents, for the attracting of animals such as deer comprising a cylindrical outer housing, an inner assembly, slidably received within the housing and an absorbent wick disposed within the inner assembly for saturation with a liquid attractant such as deer urine. The inner assembly comprises a hollow cylinder with a wick disposed there through, and has a plurality of holes allowing the scent given off from the liquid attractant to diffuse into the air. The device can be selectively closed when so desired to prevent unnecessary dissipation of the attractant, and further prevent unnecessary evaporation.

6 Claims, 3 Drawing Sheets

DEVICE FOR DISPENSING ANIMAL SCENTS

FIELD OF THE INVENTION

The present invention relates to aroma dispensers. Specifically this invention relates to an aroma dispensing apparatus for selectively dispensing animal attractant scents, but the apparatus may also be used for dispensing other materials, such as room deodorizers and the like.

BACKGROUND OF THE INVENTION

The use of scents or lures to attract animals is well known. The use of deer scents such as doe urine to attract deer, particularly bucks, has become more popular in recent years. While baiting game animals is generally illegal, the use of scents is allowed. Many animals including deer rely on the smell of urine and glandular secretions to communicate dominance and sexual activity. When used correctly, urine is the most reliable scent communicator, and provides for an excellent aid in hunting. When you use an animal scent as a hunting tool, it must remain fresh, so as to maintain its efficiency. Such scents are dispensed in a number of ways, and oftentimes, a hunter will use it on his clothing to mask his natural odors. Other times it is distributed at a site to attract game to that location.

One of the most effective devices for dispensing game scents is the type embodying a wick, or other absorbent material. The wick is saturated with an attractant in liquid form, which subsequently diffuses the odor into the air as the scent evaporates off the wick. When not in use, the diffusion device requires a closing means, preventing the attractant from excess evaporation, and furthermore eliminating the undesirable odor often produced from such attractants.

Numerous patents have been issued for game scent dispensing systems employing a wick for carrying the attractant, varying in their means of enclosing the wick for storing and transporting. U.S. Pat. No. 5,074,439 issued to Wilcox, discloses a sealable pouch, containing an absorbent pad saturated with attractant. The pouch is subsequently attached to the hunter by a lanyard. U.S. Pat. No. 4,302,899 issued to Dehart, discloses a sponge type wick within a housing, for mounting in a variety of locations. U.S. Pat. No. 5,263,274 issued to Speed, teaches of a pair of reservoirs connected by an exposed central string-like wick. Attractant flows from the upper reservoir down the wick to the lower reservoir. U.S. Pat. No. 6,241,161 issued to Corbett discloses a container and a flexible cylindrical core containing a wick, which can be hung in a specific location from a lanyard, or partially pushed into the ground with the assistance of a conical ended container. The main disadvantage being the method of securing the wick within the container when not in use may be prone to opening, thereby releasing the attractant; when it is undesired to do so.

In light of the aforementioned patents and inventions, it thus is seen that a need remains for a device for easily dispensing animal scents which is convenient to use, easy to transport, and can be securely sealed when so desired. Accordingly it is to the provision of such a device that the present invention is primarily directed.

SUMMARY OF THE INVENTION

It is therefore an object of the present invention to provide for a device for dispensing a wide variety of different scents, preferably, but not necessarily animal scents, wherein the attractant is contained within an inner sealable wick.

It is a more specific object of the present invention to provide for a refillable device for dispensing animal scents which is refillable once the attractant has significantly diffused, or if it is desired, to replace or exchange the attractant material for any reason, i.e. attractant has become rancid.

It is another object of the present invention to provide for a sealable device for dispensing animal scents that can be easily transported without concern that it may possibly open when undesired.

It is a further object of the present invention to provide for a device for dispensing animal scents which comprises a single component once assembled, preventing the separation and loss of separate parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
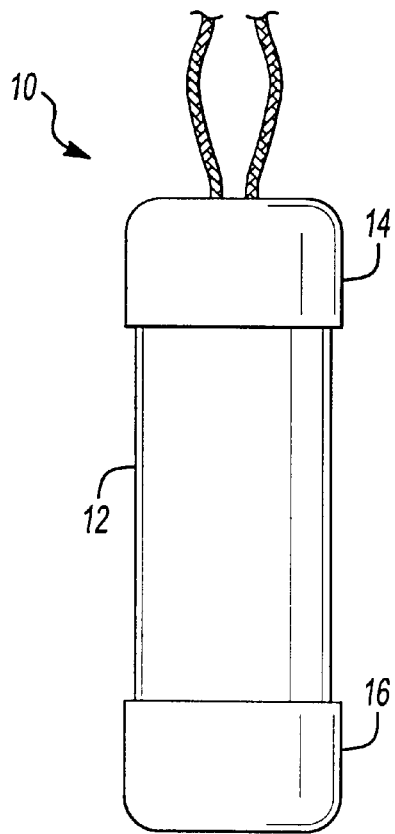
FIG. 1 is a side view of the device for dispensing animal scents in the closed and sealed configuration.
Figure 2:
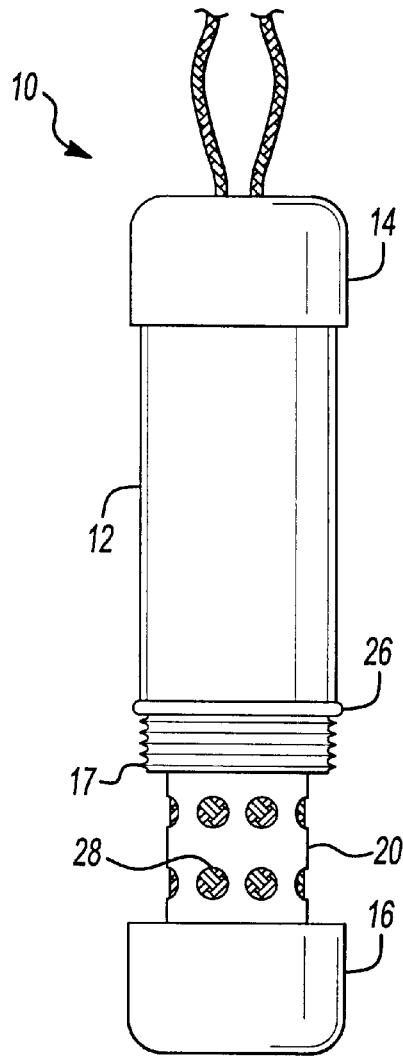
FIG. 2 is a side view of the device for dispensing animal scents in the open, functioning orientation

The device for dispensing animal scents comprising the present invention is shown generally in FIGS. 1 and 2 as numeral 10. Specifically, FIG. 1 shows the preferred embodiment in the closed position for storage and transportation, and FIG. 2 shows the preferred embodiment in the open, functional position. The device is generally comprised of a rigid, cylindrical outer housing 12 which has tapered external threads at the upper 15 and lower 17 ends thereof, an upper internally threaded cap 14, a lower internally threaded cap 16, and an inner wick retaining tube 20. The outer housing 12 is adapted to have the upper cap 14 threadably received on the upper end 15 thereof and the lower cap 16 threadably received on the lower end 17 thereof. The lower cap 16 is further attached to the lower end 22 of the wick retaining tube 20, which is slidably received within the outer housing 12, when the device is closed. Sealing means such as o-rings or the like may be optionally used to provide desired sealing between the housing 12 and caps 14 and 16.

Figure 3:
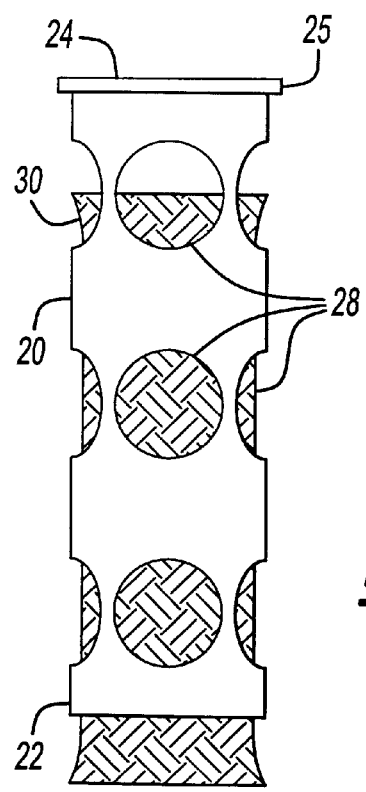
FIG. 3 is a side view of the wick retaining tube for holding the attractant soaked wick.

Referring now to FIG. 3, a side view of the wick retaining tube 20 is shown separate from the lower retaining cap 16 and outer housing 12. Having a generally cylindrical shape, the wick retaining tube 20 comprises a upper end 24 which is slidably received within the outer housing 12 and a lower end 22 which is attached to the lower cap 16. The upper end 24 embodies an annular ledge 25 for preventing separation of the wick retaining tube 20 from the housing 12. In an alternative embodiment, FIG. 3a shows the upper end 24 of the wick retaining tube 20 having a tapered ledge 27 for frictionally wedging against a corresponding tapered inner wall 32 of the outer housing 12 preventing separation of the wick retaining tube 20 and the outer housing 12. The lower end 22 of the wick retaining tube 20 is received, and permanently attached within the lower cap 16.

An absorbent wick 30 is received within the wick retaining tube 20, for holding a liquid form of odorant, for example but not limited to animal attractant such as deer urine. The wick retaining tube 20 comprises a plurality of apertures 28 there through in a predetermined pattern for allowing the odor of the animal attractant on the wick 30 to diffuse out into the air, thereby attracting game. The wick 30 is comprised of an absorbent material commonly used in the science, which can be repeatedly dampened, i.e. saturated, with attractant once a significant amount has evaporated, thereby maintaining the effectiveness of the apparatus in attracting animals. In the case where the attractant may have gone rancid or if it is desired to exchange the attractant for another type, the wick 30 can be entirely replaced, i.e. substituting moose urine for deer urine.

Figure 4:
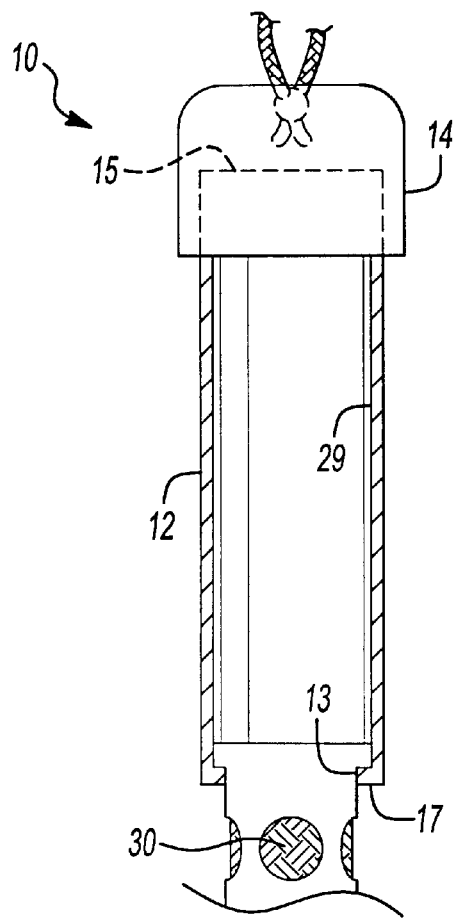
FIG. 4 is a partial vertical-sectional view of the container showing the tapered threads at the upper and lower ends thereof, and the extended wick retaining tube for holding the wick.

As shown in FIG. 4, when assembled, the wick retaining tube 20 is slidably received within the outer housing 12. The outer housing 12 has a deeply recessed counter-bore 13 at the lower end 17 which engages with the annular ledge 25 of the inner wick retaining tube 20 during extension of the apparatus 10, preventing separation of the two components. FIG. 4a shows an alternative embodiment wherein the wick retaining tube 20 has a downwardly decreasing tapered external surface 27 that cooperates with a downwardly decreasing tapered surface 32 on the interior of the housing 12 for achieving via wedging action the same results of retaining the two components together when the tube 20 is extended.

Figure 5:
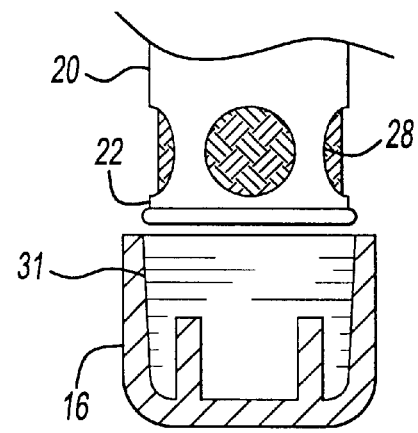
FIG. 5 is a view partially in vertical-section and partially broken away of the wick retaining tube and lower retaining cap.
Figure 6:
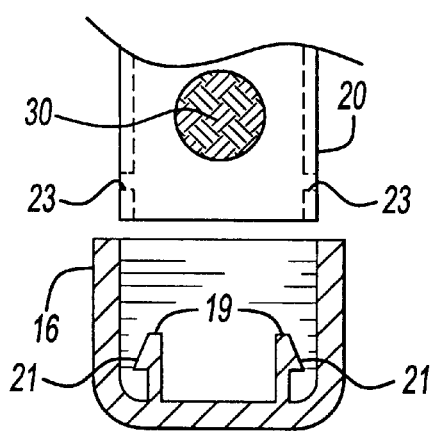
FIG. 6 is a view partially in vertical-section and partially broken away of an alternative embodiment of the wick retaining tube and lower retaining cap.
Figure 7:
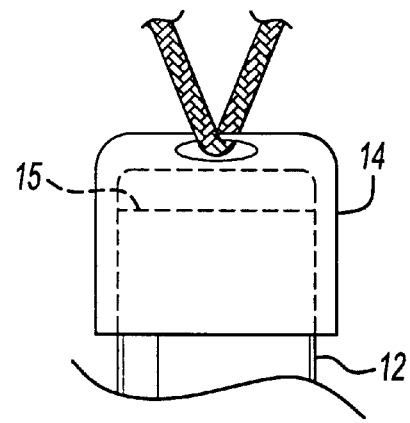
FIG. 7 is a partial vertical-sectional view of the upper retaining cap.
Figure 8:
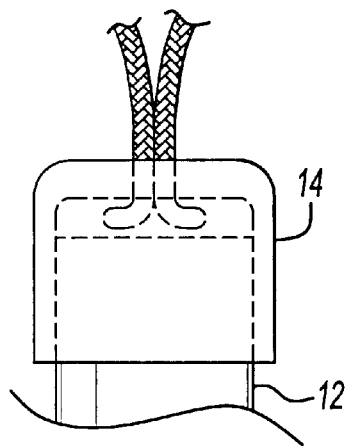
FIG. 8 is a partial vertical-sectional view of an alternative embodiment of the upper retaining cap.
Figure 9:
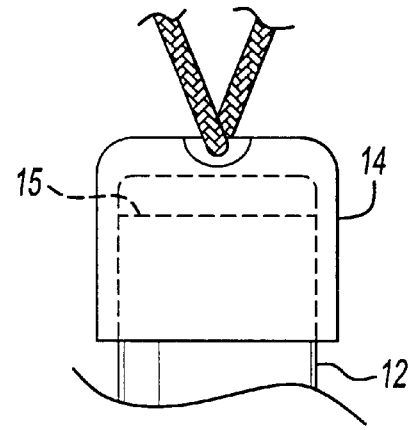
FIG. 9 is a partial vertical-sectional view of another alternative embodiment of the upper retaining cap.
Figure 10:
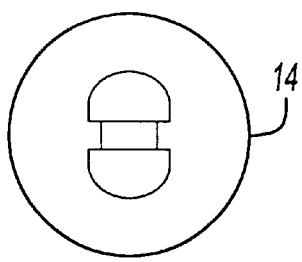
FIG. 10 is a top view of the upper retaining cap of FIG. 7.
Figure 11:
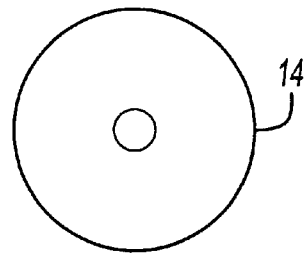
FIG. 11 is a top view of the upper retaining cap of FIG. 8.
Figure 12:
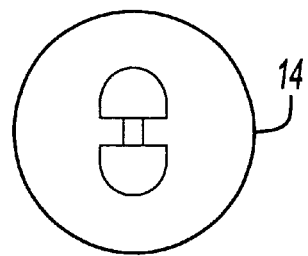
FIG. 12 is a top view of the upper retaining cap of FIG. 9.

Referring now to FIGS. 5 and 6, two embodiments of the lower cap 16 are illustrated, embodying various means for attaching to the lower end 22 of the wick retaining tube 20. Specifically, FIG. 5 shows the lower cap 16 having an inner bore 31 for receiving the corresponding threaded lower end 22 of the wick retaining tube 20. An interference fit or a suitable adhesive may be used in securely attaching the lower end 22 of the tube 20 with the inner bore 31 of the lower cap 16. FIG. 6 shows an embodiment of the lower cap 16 having a plurality of upward projecting elements 19, with tabs 21 which are received within corresponding apertures 23 in the lower end 22 of the wick retaining tube 20. Both methods for assembly of the lower cap 16 to the wick retaining tube 20 are intended to permanently attach the two elements, preventing incidental release, and neither attachment means should interfere with the internal threads in the cap 16 which threadably engage the externally threaded lower end of the housing 12 to maintain the tube 20 in a closed position there within.

Referring now to FIGS. 7 through 12, alternative embodiments for the upper cap 14 are shown. The variations of each embodiment differ in design of the cap, and respectively, the means of attachment for a string allowing for the animal scent dispensing device to be hung from a variety of objects.

The device 10 is designed to be carried around in the closed position, wherein the upper and lower caps 14 and 16 are threadably secured to the outer housing 12 until it is so desired to allow the attractant to diffuse into the air. When it is desired to open the device 10 to dispense the scent, either of two procedures can be followed. First, the lower cap 16 can be unthreaded from the housing 12 and the wick retaining tube 20 can be extended downwardly, as shown in FIG. 2. This procedure is best used when the device 10 is hung from a tree or other support via the cord shown in FIGS. 7–9. Alternatively, the device 10 could be placed upon a generally horizontal surface and the upper cap 14 could be threadably disengaged from the housing 12, whereupon the wick 30 could be extended upwardly out of the upper end of the housing 12 for scent dispersal. In either case, once the scent dispersal is completed, the wick retaining tube 20 or the internal wick 30 can be returned into the housing 12 and the appropriate cap 14 or 16 re-threaded to the housing 12 to maintain an effective enclosure so as to prevent further dispersal of the scent until the device is next used. Note that when the upper cap 14 is removed, the entire wick can be replaced and/or re dampened or re saturated. Also, while specific reference has been made herein to the device 10 being used as a hunting aid, i.e. for dispensing animal attractant scents, the device 10 will find wide and varied other applications for dispensing other types of odorants, disinfectants, etc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A refillable device for dispensing animal scents comprising:
   a cylindrical outer housing having a threaded upper end and a threaded lower end, said outer housing having an inner bore, and a sealing means disposed annularly around the lower end of said housing;
   an inner wick retaining tube having an upper end and a lower end, slidably received within said inner bore of said outer housing;
   an upper attachment cap, closing off the upper end of said outer housing, said upper attachment cap having tapered threads for threadably receiving said upper end of said outer housing;
   a lower closure cap, attached to the lower end of said wick retaining tube, said lower closure cap having tapered threads for threadably receiving said lower end of said outer housing;

an absorbent wick of specific length, disposed within an inner bore of said wick retaining tube, said wick comprising an absorbent material for repeatedly receiving saturation of an animal attractant such as deer urine.

2. The device for dispensing animal scents of claim 1, wherein said outer housing has an annular lip within said inner bore for preventing said wick retaining tube from separating from said housing.

3. The device for dispensing animal scents of claim 1 wherein said wick retaining tube has a plurality of apertures there through.

4. The device for dispensing animal scents of claim 1 where in said wick retaining tube is permanently attached to said lower closure cap.

5. The device for dispensing animal scents of claim 1 wherein when said device is open, the wick retaining tube is maintained in connection with said outer housing.

6. The device for dispensing animal scents of claim 1, wherein said upper cap has a means for attachment to a string for hanging.

* * * * *

UNITED STATES PATENT AND TRADEMARK OFFICE
CERTIFICATE OF CORRECTION

PATENT NO. : 6,648,239 B1
DATED : November 18, 2003
INVENTOR(S) : Michael A. Myny et al.

It is certified that error appears in the above-identified patent and that said Letters Patent is hereby corrected as shown below:

Column 3,
Line 25, "FIG. 3a" should be -- FIG. 3 --
Line 53, "FIG. 4a" should be -- FIG. 4 --

Column 4,
Line 38, "re dampened or re saturated" should be -- re-dampened or re-saturated --

Column 5,
Line 4, delete "such as deer urine"

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,648,239 B2 | |
| APPLICATION NO. | : 10/229182 | |
| DATED | : November 18, 2003 | |
| INVENTOR(S) | : Michael A. Myny et al. | |

It is certified that error appears in the above-identified patent and that said Letters Patent is hereby corrected as shown below:

Col. 2, after line 34, insert:
--Fig. 3A is a partial side view of the upper end of the wick retaining tube having a tapered external surface;--

Col. 2, after line 38, insert:
--Fig. 4A is a partial vertical sectional view of an alternate embodiment showing the container having a tapered internal surface, cooperating with the tapered outer surface of the wick retaining tube;--

Figure 3A and 4A should be deleted to appear as per illustrated figures below:

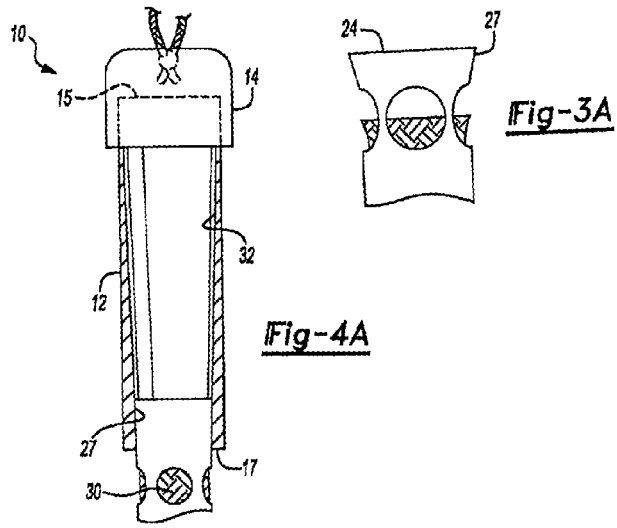

Signed and Sealed this

Nineteenth Day of February, 2008

JON W. DUDAS
*Director of the United States Patent and Trademark Office*